3,028,246
PHOSPHATE MIXTURES FOR CURING MEATS
Robert J. Oliver, Fort Wayne, Ind., and Marvin M. Voegeli, Downers Grove, Ill., assignors to Swift & Company, Chicago, Ill., a corporation of Illinois
No Drawing. Filed Apr. 30, 1959, Ser. No. 809,921
8 Claims. (Cl. 99—222)

This invention relates to the treatment of meat and, more particularly, to an improved process for preparing cured meat products having desirable color, flavor, and nutritional characteristics.

With the development and use of disodium phosphate and sodium tripolyphosphate in brines employed in treating meat, the color and flavor as well as the water-binding properties of the cured products have been greatly improved. Also, discoloration or color deterioration in the cured product is inhibited.

Accompanying the advantages provided by each of these phosphates in curing agent mixes, certain disadvantages have been introduced. While disodium phosphate in combination with nitrate-nitrite curing agents and flavoring agents has found a wide area of use, the low solubility of disodium phosphate in brine solutions at temperatures lower than about 120° F. has limited its usefulness.

Sodium tripolyphosphate, as well as other molecularly dehydrated phosphates, has also been employed as an ingredient in meat curing compositions, but sodium tripolyphosphate is not easily soluble in curing pickle and, therefore, this phosphate additive is not nearly as versatile as may be desired. For example, a large amount of pumping pickle is prepared from reclaimed cover pickle which contains salt. Since sodium tripolyphosphate is not directly soluble in this cover pickle, new pickle must be made up for pumping and the cover pickle discarded.

It is, therefore, an object of this invention to provide an improved method for preparing cured meat whereby desirable color, flavor, and nutritive values of the meat product are maintained at a high level and difficulties in processing are avoided.

A further object of the invention is the provision of an improved phosphatic salt mixture adapted for use in meat brine curing operations.

Other objects, if not specifically set forth herein, will become readily apparent to those skilled in the art from the detailed description which follows.

Generally this invention comprises an improved process for manufacturing cured meat products wherein a novel phosphatic salt mixture in combination with curing agents is employed. This phosphatic salt mixture provides all of the advantages known in the prior art methods while avoiding many of the objectionable features inherent in previous methods. The process has application to the production of various kinds of cured meat such as sausages, frankfurters, bologna, ham, bacon, dried beef, etc., and also to the various methods for obtaining distribution of the curing agent throughout the meat. The phosphatic salt mixture is made up of a dibasic alkali metal phosphate, a monobasic alkali metal phosphate, and an alkali metal acid pyrophosphate. Other phosphatic materials such as alkali metal tetra pyrophosphate may also be employed in the phosphate mix so long as they do not promote crystallization at the low temperature at which we prefer to use curing pickle.

More specifically this invention contemplates the use of brines containing a phosphatic salt mix made up of 20–45% disodium phosphate, 30–45% monosodium phosphate, and 10–20% sodium acid pyrophosphate. The mixture provides unique results when employed with a curing agent or source of nitric oxide in the treatment of fresh meat products. The mixture will not crystallize out of brine when held at cooler temperatures (36–40° F.) for a minimum of 24 hours, it is readily soluble in brine, and improves the retention by the meat of the water-soluble protein factor. Of course the mixture will not crystallize out of brine at temperatures above 40° F. In addition, the phosphatic salt mix does not increase the corrosive effect of the brine on the metal tanks and lines with which the pickle or brine comes in contact.

The phosphatic salt mix provides an additional advantage since by the combination of salts the mix is found to be soluble in existing pickle and need not be dissolved in water prior to addition to the pickle. The out-of-process yield is improved where the phosphatic salt mixture of this invention is employed, and the color of the product is very stable. When employed in the recommended range of amounts, the composition of the present invention provides one or more benefits not exhibited by prior art compositions.

Moreover, the phosphate salt mix of the present invention when added to conventional curing brines, unlike prior art phosphates such as disodium phosphate and sodium tripolyphosphate, renders the brine slightly acid. Brines containing disodium phosphate or sodium tripolyphosphate are ordinarily alkaline (pH 7.2–7.6), and this alkalinity has been considered important in providing high out-of-process yield in cooked hams. Yet, brines containing the phosphatic salt mix of the present invention are usually acidic (pH 5.0–6.4) and out-of-process yield of cooked hams is at least equivalent to the yield obtained when disodium phosphate or sodium tripolyphosphate is employed as the phosphatic component in the brine. Thus, it is quite surprising that brines containing the phosphate mix of this invention and which are usually slightly acidic insure retention of water-soluble proteins in the out-of-process yield ham.

The preferred alkali metal salts employed in the practice of this invention, because they are nontoxic and do not present taste and edibility problems, are the sodium salts. A mixture containing 20–45% disodium phosphate, 30–45% monosodium phosphate, 10–20% sodium acid pyrophosphate, and 0–35% tetrasodium pyrophosphate provides all of the advantages enumerated above while avoiding the shortcomings of previously known phosphatic salt combinations when employed with cold brines. Alkali metal salts other than the sodium salts may be employed with correspondingly less desirable results. Usually about 2–10% based on the weight of the brine of the phosphatic salt mixture can be employed to obtain the operating and product advantages described herein although a desirable operating range encompasses about 3–5% of the salt mixture. The dibasic alkali phosphate can advantageously be employed at a concentration of about 0.5–2.5% by weight of the brine.

The proper ratio of phosphate-supplying elements in the phosphatic salt mix provides in the individual salts per se or in the combination of salts after admixture about 24.2–25.7% pentavalent phosphorus. It has been discovered that when this condition is satisfied the disodium phosphate component is readily soluble even in lower salometer (less than 70°) brines and the brine can be cooled to cooler temperatures (36°–40° F.) without cloudiness or crystallization taking place in the brine.

The phosphatic salt mix can be employed in any of the various meat curing methods using liquid curing pickles such as in the pump type cure wherein the brine is pumped through the vascular system of the tissue as well as the comminuted meat cure where the curing pickle is incorporated into the meat by direct mixing. In all cases the phosphatic salt mixture will be combined with common salt (sodium chloride) and flavoring agents such as sugar and curing agents such as sodium nitrate and sodium nitrite. When employed in solution the salt or pickling brine contains around 15% or more by weight of sodium chloride. The amount of salts is usually expressed by a salometer value and the conventional brines have a salometer value between about 30° and 70°.

The following examples show specific embodiments of the present invention.

Example I

A phosphatic salt mixture containing 20% disodium phosphate, 40% monosodium phosphate, 20% tetrasodium pyrophosphate, and 20% sodium acid pyrophosphate was prepared and found to contain, upon analysis, 25.0% pentavalent phosphorus. Five parts of this phosphate mixture was added to 100 parts of a curing pickle containing approximately 15% sodium chloride, 4% sugar, 0.1% sodium nitrite, 0.1% sodium nitrate, and 80.8% water at 38° F. At this temperature the final pumping pickle has an 84° salometer reading.

This pickle was pumped arterially into several hams to the extent of about 10% basis weight of green hams, and the pumped hams were covered with a mixture of salt and sodium nitrite and piled on racks to cure for about 6 days at 36–40° F.

A like number of paired hams were treated with the same pickle composition containing disodium phosphate substituted for the phosphatic salt mix of this invention. The curing pickle was warmed to 135° F. which temperature is mandatory when using disodium phosphate or other phosphatic mixtures having a tendency to crystallize at lower temperatures. The cured hams were then washed, boned, placed in cans, and cooked to an internal temperature of about 152° F.

The following tables show the out-of-can yields of these ham pairs pumped cold (38° F.) with the basic curing pickle containing mixed phosphates and hams pumped hot (135° F.) with the basic curing pickle containing disodium phosphate:

Pumped at 38° F.

| Ham No. | Pair of Ham No. | Green Wt. | | Pumped Wt. | | Cured Wt. | | Into Can Wt. | | Out of Can Wt. | | Yield |
|---|---|---|---|---|---|---|---|---|---|---|---|---|
| | | lbs. | oz. | lbs. | oz. | lbs. | oz. | lbs. | oz. | lbs. | oz. | |
| 1226 | 1201 | 15 | 15 | 17 | 6 | 17 | 1 | 10 | 4 | 8 | 13 | 86.6 |
| 1230 | 1205 | 11 | 15 | 13 | 1 | 12 | 14 | 10 | 4 | 9 | 1.5 | 89.0 |
| 1231 | 1206 | 9 | 14 | 10 | 14 | 10 | 10 | 8 | 14 | 7 | 14 | 88.7 |
| 1232 | 1207 | 12 | 3 | 13 | 7 | 13 | 3 | 10 | 4 | 9 | 2 | 89.0 |
| 1233 | 1208 | 11 | 0 | 12 | 2 | 11 | 15 | 10 | 0 | 9 | 3 | 93.8 |
| 1234 | 1209 | 11 | 9 | 12 | 14 | 12 | 11 | 10 | 4 | 9 | 4 | 90.3 |
| 1235 | 1210 | 11 | 7 | 12 | 14 | 12 | 6 | 10 | 4 | 9 | 9 | 93.3 |
| 1236 | 1211 | 11 | 9 | 12 | 13 | 12 | 9 | 10 | 4 | 9 | 5 | 90.9 |
| 1237 | 1212 | 11 | 14 | 13 | 0 | 12 | 12 | 10 | 4 | 9 | 5 | 90.9 |
| 1238 | 1213 | 11 | 6 | 12 | 10 | 12 | 6 | 10 | 4 | 9 | 7 | 92.1 |
| 1239 | 1214 | 11 | 4 | 12 | 5 | 12 | 0 | 10 | 0 | 9 | 4.5 | 92.8 |
| 1243 | 1218 | 11 | 5 | 12 | 6 | 12 | 1 | 9 | 9 | 8 | 12.5 | 91.8 |
| 1245 | 1220 | 13 | 10 | 15 | 2 | 14 | 11 | 10 | 4 | 8 | 15 | 87.2 |
| 1246 | 1221 | 10 | 2 | 11 | 4 | 11 | 2 | 9 | 3 | 8 | 8.5 | 92.8 |
| 1247 | 1222 | 11 | 15 | 13 | 5 | 13 | 4 | 10 | 4 | 9 | 13.5 | 96.0 |
| 1248 | 1223 | 11 | 11 | 12 | 15 | 12 | 13 | 10 | 4 | 9 | 7 | 92.1 |
| 1249 | 1224 | 14 | 4 | 15 | 9 | 15 | 3 | 10 | 4 | 9 | 9.5 | 89.3 |
| | | | | | | | | | | | | Av. 90.6 | pH of the pickle = 5.3.

Pumped at 135° F.

| Ham No. | Pair of Ham No. | Green Wt. | | Pumped Wt. | | Cured Wt. | | Into Can Wt. | | Out of Can Wt. | | Yield |
|---|---|---|---|---|---|---|---|---|---|---|---|---|
| | | lbs. | oz. | lbs. | oz. | lbs. | oz. | lbs. | oz. | lbs. | oz. | |
| 1201 | 1226 | 15 | 12 | 17 | 3 | 16 | 15 | 10 | 4 | 9 | 0 | 87.8 |
| 1205 | 1230 | 12 | 1 | 13 | 5 | 13 | 0 | 10 | 4 | 9 | 1 | 88.4 |
| 1206 | 1231 | 10 | 11 | 11 | 15 | 11 | 12 | 10 | 4 | 9 | 5 | 90.9 |
| 1207 | 1232 | 12 | 15 | 14 | 4 | 14 | 1 | 10 | 4 | 9 | 1 | 88.4 |
| 1208 | 1233 | 11 | 1 | 12 | 3 | 12 | 0 | 10 | 1 | 9 | 5.5 | 92.9 |
| 1209 | 1234 | 11 | 10 | 13 | 0 | 12 | 12 | 10 | 4 | 9 | 2 | 89.0 |
| 1210 | 1235 | 11 | 11 | 12 | 15 | 12 | 11 | 10 | 4 | 9 | 5.5 | 91.2 |
| 1211 | 1236 | 11 | 12 | 13 | 1 | 12 | 12 | 10 | 4 | 9 | 5.5 | 91.2 |
| 1212 | 1237 | 12 | 4 | 13 | 6 | 13 | 3 | 10 | 4 | 9 | 5 | 90.9 |
| 1213 | 1238 | 11 | 10 | 12 | 14 | 12 | 9 | 10 | 4 | 9 | 7 | 92.1 |
| 1214 | 1239 | 11 | 8 | 12 | 10 | 12 | 4 | 10 | 4 | 9 | 8 | 93.7 |
| 1218 | 1243 | 14 | 6 | 15 | 11 | 15 | 6 | 10 | 4 | 9 | 11.5 | 94.8 |
| 1220 | 1245 | 14 | 2 | 15 | 10 | 15 | 4 | 10 | 4 | 9 | 1 | 88.4 |
| 1221 | 1246 | 10 | 1 | 11 | 4 | 11 | 3 | 9 | 9 | 8 | 14 | 92.8 |
| 1222 | 1247 | 11 | 3 | 12 | 8 | 12 | 7 | 10 | 4 | 9 | 12 | 95.1 |
| 1223 | 1248 | 11 | 8 | 12 | 11 | 12 | 9 | 10 | 4 | 9 | 7.5 | 92.4 |
| 1224 | 1249 | 14 | 12 | 16 | 2 | 15 | 11 | 10 | 4 | 9 | 4.5 | 88.7 |
| | | | | | | | | | | | | Av. 91.1 | pH of the pickle = 7.5.

From these average yield figures 90.6 (cold) and 91.1 (hot) it is apparent that there is no significant difference in yield whether the hams are pumped with a brine containing disodium phosphate as the phosphate salt or the phosphate mix of this invention and which has a pentavalent phosphorus content of from 24.2 to 25.7%. Outside this range of pentavalent phosphorus content there is troublesome crystallization when the pickle solution is used or stored at cooler temperatures. Obviously other phosphate mixtures can be used at higher temperatures but the use of higher temperatures results in warming of the hams with the subsequent need of rechilling, all of which creates an opportunity for undesirable bacterial growth.

The following examples were carried out just as in Example I using 5% of the phosphate salt mixture (composition as shown) in the curing pickle at 38–40° F. without the occurrence of crystallization.

| Ex. No. | Percent Composition of Phosphate Mixture | | | | Percent Pentavalent Phosphorus in the phosphate Mixture | Crystallization | Percent Yield |
|---|---|---|---|---|---|---|---|
| | $Na_2HPO_4$ | $NaH_2PO_4$ | $Na_4P_2O_7$ | $Na_2H_2P_2O_7$ | | | |
| II | None | 50 | 25 | 25 | 25.7 | None | 89.8 |
| III | 25 | 40 | 20 | 15 | 24.7 | ...do.... | 91.2 |
| IV | 30 | 40 | 20 | 10 | 24.3 | ...do.... | 90.7 |
| V | 25 | 45 | 20 | 10 | 24.6 | ...do.... | 93.1 |
| VI | 20 | 40 | 25 | 15 | 24.7 | ...do.... | 91.6 |
| VII | 25 | 40 | 25 | 10 | 24.4 | ...do.... | 88.4 |
| VIII | 20 | 30 | 30 | 20 | 24.7 | ...do.... | 94.1 |
| IX | 25 | 30 | 35 | 10 | 24.2 | ...do.... | 90.0 |
| X | 20 | 30 | 40 | 10 | 24.2 | ...do.... | 89.9 |

Further examples in which the procedure of Example I was followed except for the use of "cover pickle" instead of the dry salt and nitrite during the 6-day cure are as follows.

After pumping as in Example I with 5% of the phosphate mixture added to the pumping pickle, the pumped hams were covered with 50° salometer sodium chloride brine containing .075% sodium nitrite and 0.075% sodium nitrate and cured for 6 days at 36° F. without crystallization occurring during the entire curing period.

| Ex. No. | Percent Composition of Phosphate Mixture | | | | Percent Pentavalent Phosphorus in the Phosphate Mixture | Crystallization | Yield |
|---|---|---|---|---|---|---|---|
| | Na₂HPO₄ | NaH₂PO₄ | Na₄P₂O₇ | Na₂H₂P₂O₇ | | | |
| XI | 20 | 30 | 30 | 20 | 24.7 | None | 91.2 |
| XII | 25 | 30 | 25 | 10 | 24.2 | do | 93.1 |
| XIII | 20 | 30 | 40 | 10 | 24.2 | do | 90.5 |
| XIV | 20 | 30 | 35 | 15 | 24.5 | do | 89.8 |
| XV | 30 | 35 | 20 | 15 | 24.4 | do | 88.9 |
| XVI | 30 | 40 | 15 | 15 | 24.5 | do | 92.6 |
| XVII | 25 | 35 | 20 | 20 | 24.8 | do | 90.9 |
| XVIII | 25 | 35 | 25 | 15 | 24.5 | do | 91.4 |
| XIX | 25 | 35 | 30 | 10 | 24.3 | do | 88.6 |
| XX | 30 | 30 | 20 | 20 | 24.5 | do | 90.0 |

In order to show compositions of phosphate salt mixtures which tend to crystallize at 40° F. and below when added to the curing pickle of Examples I to XX, the following examples are given. The curing pickle of Examples I to XX was treated with 5% of the phosphate mixtures shown in the following table and held for 24 hours at 38° F.

| Ex. No. | Percent Composition of Phosphate Mixture | | | | Percent Pentavalent Phosphorus in the Mixture | Crystallization |
|---|---|---|---|---|---|---|
| | Na₂HPO₄ | NaH₂PO₄ | Na₄P₂O₇ | Na₂H₂P₂O₇ | | |
| XXI | 25 | 50 | 25 | 0 | 28.3 | Heavy. |
| XXII | 33 | 0 | 33 | 33 | 24.1 | Slight. |
| XXIII | 50 | 50 | 0 | 0 | 23.8 | Moderate. |
| XXIV | 50 | 0 | 50 | 0 | 22.6 | Heavy. |
| XXV | 35 | 35 | 20 | 10 | 24.1 | Slight. |
| XXVI | 40 | 30 | 20 | 10 | 23.4 | Moderate. |
| XXVII | 45 | 25 | 20 | 10 | 23.7 | Do. |
| XXVIII | 35 | 35 | 25 | 5 | 23.8 | Do. |
| XXIX | 35 | 25 | 30 | 10 | 23.8 | Do. |
| XXX | 40 | 20 | 30 | 10 | 23.2 | Heavy. |
| XXXI | 40 | 15 | 35 | 10 | 23.1 | Do. |
| XXXII | 45 | 15 | 35 | 5 | 23.3 | Moderate. |
| XXXIII | 30 | 30 | 30 | 10 | 24.0 | Slight. |

From the foregoing examples, it will be noted that all curing solutions which do not crystallize at 36–40° F. contain pentavalent phosphorus to the extent of from 24.2 to 25.7 basis dry phosphate salts. Conversely phosphate mixtures which crystallize under the same conditions fall outside this range usually depositing crystals more heavily the further away from the desired range one goes.

Obviously many modifications and variations of the invention hereinbefore set forth may be made without departing from the spirit and scope thereof and, therefore, only such limitations should be imposed as are indicated in the appended claims.

We claim:
1. A composition adapted for use in the brine curing of meat comprising salt, sugar, and a source of nitric oxide and a mixture of phosphatic salts, said phosphatic salt mixture comprising dibasic alkali metal phosphate, monobasic alkali metal phosphate, and alkali metal acid pyrophosphate, the ratio of the phosphate components of said mixture being such that the content of pentavalent phosphorus is in the range of 24.2–25.7% basis dry phosphate mixture.

2. In the process of manufacturing cured meat products wherein the meat tissue is contacted with a mixture of phosphatic salts to improve the cooked yield thereof, the improvement comprising treating the meat product with a curing agent and a phosphatic salt mixture, said phosphatic salt mixture comprising 20–45% disodium phosphate, 30–45% monosodium phosphate, 10–20% sodium acid pyrophosphate, and 0–35% tetrasodium pyrophosphate.

3. A brine for use in the preparation of cured meat products, comprising an aqueous solution of flavoring agents, curing agents, and dibasic alkali metal phosphate, said brine also containing sufficient monobasic alkali metal phosphate and alkali metal acid pyrophosphate to solubilize said dibasic alkali metal phosphate at a temperature around 36–40° F. and above, said dibasic alkali metal phosphate being present at a concentration of about .5–2.5% by weight of the brine.

4. A disodium phosphate containing composition which is readily soluble in aqueous curing brines at about 40° F. and above, and having a salometer value of about 30°–70°, comprising disodium phosphate, monosodium phosphate, and sodium acid pyrophosphate in such ratio as to contain from 24.2 to 25.7% pentavalent phosphorus on the basis of the total phosphate mixture.

5. A disodium phosphate containing composition which is readily soluble in aqueous curing brines at 40° F. and above comprising disodium phosphate, monosodium phosphate and sodium acid pyrophosphate in such amounts as to adjust the content of pentavalent phosphorus in the dry phosphate mixture to between 24.2 and 25.7%.

6. A curing brine for use in meat products to be subsequently cooked which contains, in addition to sodium chloride, sugar, sodium nitrite, and sodium nitrate, a mixture of alkali metal phosphates comprising disodium phosphate, monosodium phosphate, sodium acid pyrophosphate, and tetrasodium pyrophosphate in such ratio as to contain from 24.2 to 25.7% pentavalent phosphorus on the basis of the total dry alkali metal phosphate mixture.

7. A curing brine containing a mixture of alkali metal phosphates up to 2.5% basis total brine weight which phosphates consist of disodium phosphate, monosodium phosphate, sodium acid pyrophosphate, and sodium pyrophosphate in such ratio as to adjust the content of pentavalent phosphorus in the dry phosphate mixture to between 24.2 and 25.7% thereby preventing the crystallization of said phosphates when the curing brine is held at 40° F. for 24 hours.

8. In the process of preparing a cooked, cured ham wherein the fresh ham is cured with a curing brine, the improvement which comprises treating fresh ham with a meat curing preparation containing a small amount of a phosphatic salt mix comprising disodium phosphate, monosodium phosphate, sodium acid phosphate, sodium acid pyrophosphate, and tetrasodium pyrophosphate in such ratio as to contain from 24.2–25.7% pentavalent phosphorus based on the weight of the dry alkali metal phosphate mixture whereby the cured meat product when cooked retains a substantial amount of water-soluble protein and exhibits an improved cooked yield.

References Cited in the file of this patent

UNITED STATES PATENTS

| | | |
|---|---|---|
| 2,596,067 | Brissey | May 6, 1952 |
| 2,812,262 | Wasserman | Nov. 5, 1957 |
| 2,876,115 | Epstein | Mar. 3, 1959 |

OTHER REFERENCES

"Chemicals and the Meat Industry," June 1955, Circular No. 14, by H. R. Kraybill, published by American Meat Institute, 939 East 57th Street, Chicago, Ill., page 5, article entitled Curing Ingredients.